(12) United States Patent
Fujitsuka et al.

(10) Patent No.: US 12,017,401 B2
(45) Date of Patent: Jun. 25, 2024

(54) MOLDING DEVICE

(71) Applicant: KABUSHIKI KAISHA TOYOTA CHUO KENKYUSHO, Nagakute (JP)

(72) Inventors: Norio Fujitsuka, Nagakute (JP);
Keiichi Shimaoka, Nagakute (JP);
Teruhisa Akashi, Nagakute (JP); Shota Harada, Nisshin (JP); Yuuki Inagaki, Nisshin (JP); Katsuaki Goto, Nisshin (JP); Keitaro Ito, Nisshin (JP);
Takahiko Yoshida, Nisshin (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 18/164,268

(22) Filed: Feb. 3, 2023

(65) Prior Publication Data

US 2023/0264411 A1      Aug. 24, 2023

(30) Foreign Application Priority Data

Feb. 24, 2022   (JP) ................. 2022-027120

(51) Int. Cl.
*B29C 51/40*    (2006.01)
*B29C 51/08*    (2006.01)
*B29C 51/18*    (2006.01)

(52) U.S. Cl.
CPC ............. *B29C 51/40* (2013.01); *B29C 51/08* (2013.01); *B29C 51/18* (2013.01)

(58) Field of Classification Search
CPC ......... B29C 51/10; B29C 51/18; B29C 51/36; B29C 51/421; C03B 23/0357; G01C 19/5691
See application file for complete search history.

(56) References Cited

U.S. PATENT DOCUMENTS

| | | | | |
|---|---|---|---|---|
| 4,123,215 A | * | 10/1978 | Madenokoji | B29C 51/10 425/388 |
| 6,165,392 A | * | 12/2000 | Kobuchi | B29D 11/0073 264/1.32 |
| 2010/0000259 A1 | * | 1/2010 | Ukrainczyk | C03B 23/0357 65/107 |
| 2010/0289190 A1 | * | 11/2010 | Kawakami | G03F 7/0002 264/496 |
| 2015/0148142 A1 | * | 5/2015 | Edwards | B44C 1/105 156/445 |
| 2018/0079129 A1 | | 3/2018 | Najafi et al. | |
| 2020/0385301 A1 | * | 12/2020 | Chae | C03B 23/0357 |
| 2022/0187072 A1 | * | 6/2022 | Akashi | B81C 1/00182 |

* cited by examiner

*Primary Examiner* — Jerzi H Moreno Hernandez
(74) *Attorney, Agent, or Firm* — Oliff PLC (57) ABSTRACT

A molding device may comprise a mold, a plate, and a ring. The mold may comprise: a lower surface; an upper surface parallel to the lower surface; a hole defined in a part of the upper surface; and a through hole extending from a bottom surface of the hole to the lower surface of the mold. The plate may comprise a surface with a gas outlet defined therein. The ring may be arranged between the lower surface of the mold and the surface of the plate and connecting the mold and the plate. The ring may surround the through hole exposed on the lower surface of the mold and the gas outlet exposed on the surface of the plate. In a region where the ring is not arranged, a space may be defined between the lower surface of the mold and the surface of the plate.

7 Claims, 10 Drawing Sheets

MOLDING DEVICE

REFERENCE TO RELATED APPLICATIONS

This application claims priority to Japanese patent application No. 2022-027120, filed on Feb. 24, 2022, the entire contents of which are incorporated herein by reference.

BACKGROUND ART

The description herein relates to a molding device for a vibrating element.

US 2018/079129 A1 describes, as a high-precision gyro sensor, a Birdbath Resonator Gyroscope (BRG) that uses fused silica as its vibrating element. Specifically, a mold is placed on a plate having a gas-discharging function and a heat-dissipating function. A quartz plate is placed so as to close a hole defined in a surface of the mold. An upper surface of the quartz plate is heated by a burner while reducing an internal pressure of the hole by the gas-discharging function of the plate. By melting and deforming the quartz plate so that it enters into the hole, a semispherical vibrating element can thereby be fabricated.

DESCRIPTION

Heat in the heated quartz plate is dissipated to the plate through a contact interface between the quartz plate and the surface of the mold. Due to this, a temperature gradient in which a temperature decreases radially outward from a center of the hole is thereby generated in the quartz plate. This temperature gradient could adversely affect a processing shape of the vibrating element.

A molding device disclosed herein may comprise a mold, a plate, and a ring. The mold may comprise: a lower surface; an upper surface parallel to the lower surface; a hole defined in a part of the upper surface; and a through hole extending from a bottom surface of the hole to the lower surface of the mold. The plate may comprise a surface with a gas outlet defined therein. The ring may be arranged between the lower surface of the mold and the surface of the plate and connecting the mold and the plate. The ring may surround the through hole exposed on the lower surface of the mold and the gas outlet exposed on the surface of the plate. In a region where the ring is not arranged, a space may be defined between the lower surface of the mold and the surface of the plate.

The space is defined between the lower surface of the mold and the surface of the plate by the ring. Since a contacting area of the mold and the plate can be reduced as compared to a case in which an entirety of the lower surface of the mold is in contact with the surface of the plate, a quantity of heat dissipated from the mold to the plate can be reduced. That is, heat can be stored in the mold. Due to this, a temperature gradient that is generated in a quartz plate can be suppressed, thus processing precision of the vibrating element can be improved.

EMBODIMENT

The ring may be integrated with the plate and protrudes out from the surface of the plate.

The ring may be integrated with the mold and protrudes out from the lower surface of the mold.

The ring may be configured as a separate member from the plate and the mold.

The surface of the plate may include a recess corresponding to a shape of the ring. The ring may be arranged inside the recess. An upper end of the ring may protrude out from the surface of the plate in a state where the ring is arranged in the recess.

A melting point of the ring may be equal to or higher than 800° C.

A distance from a center axis, which extends through a center of the hole and is orthogonal to the lower surface of the mold, to an outer circumference of the ring may be smaller than a distance from the center axis to an outer circumference of the mold.

The ring may have a circular ring shape when seen along a direction orthogonal to the lower surface of the mold.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved molding devices, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
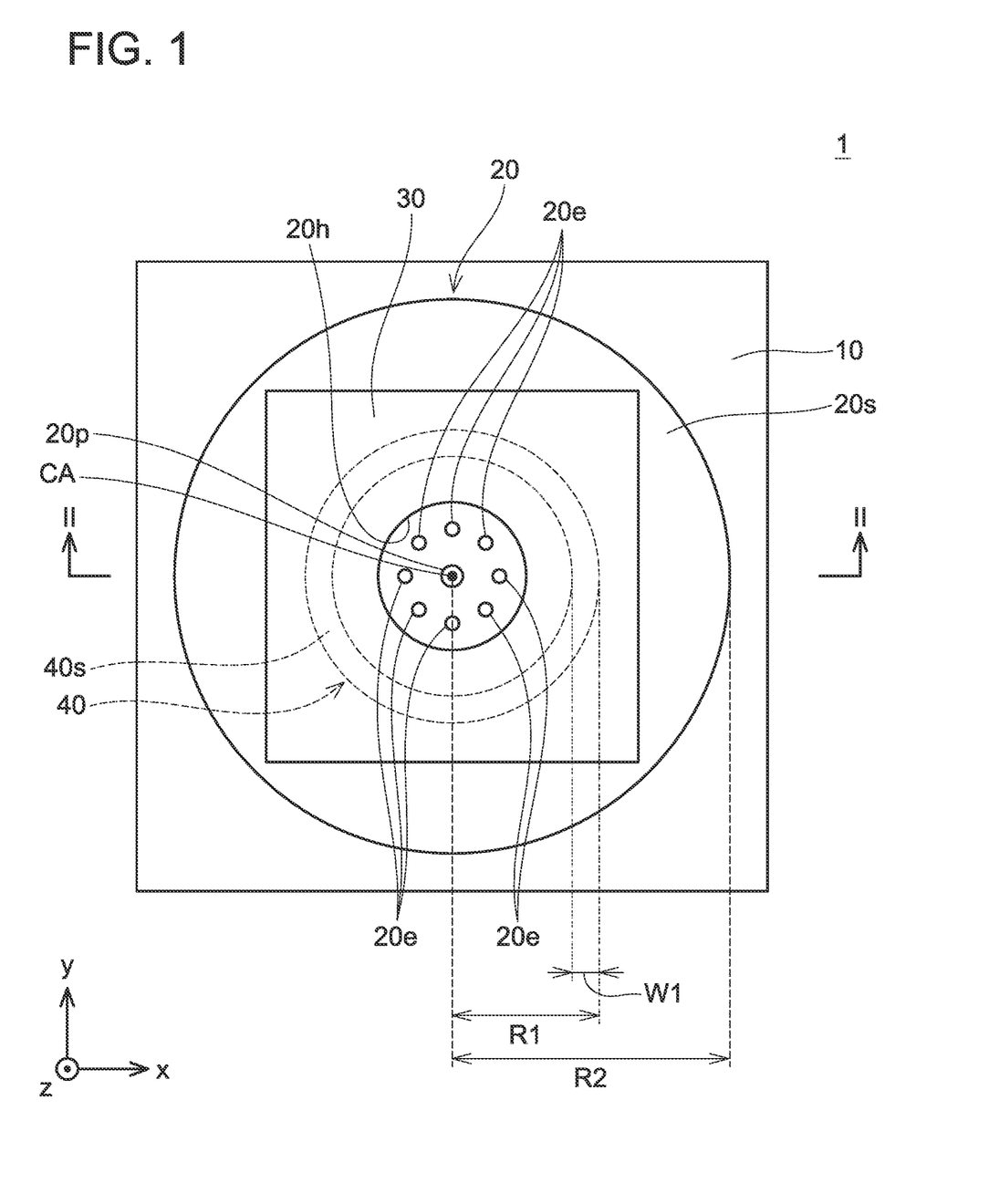
FIG. 1 is a top view of a molding device 1 of a first embodiment.
Figure 2:
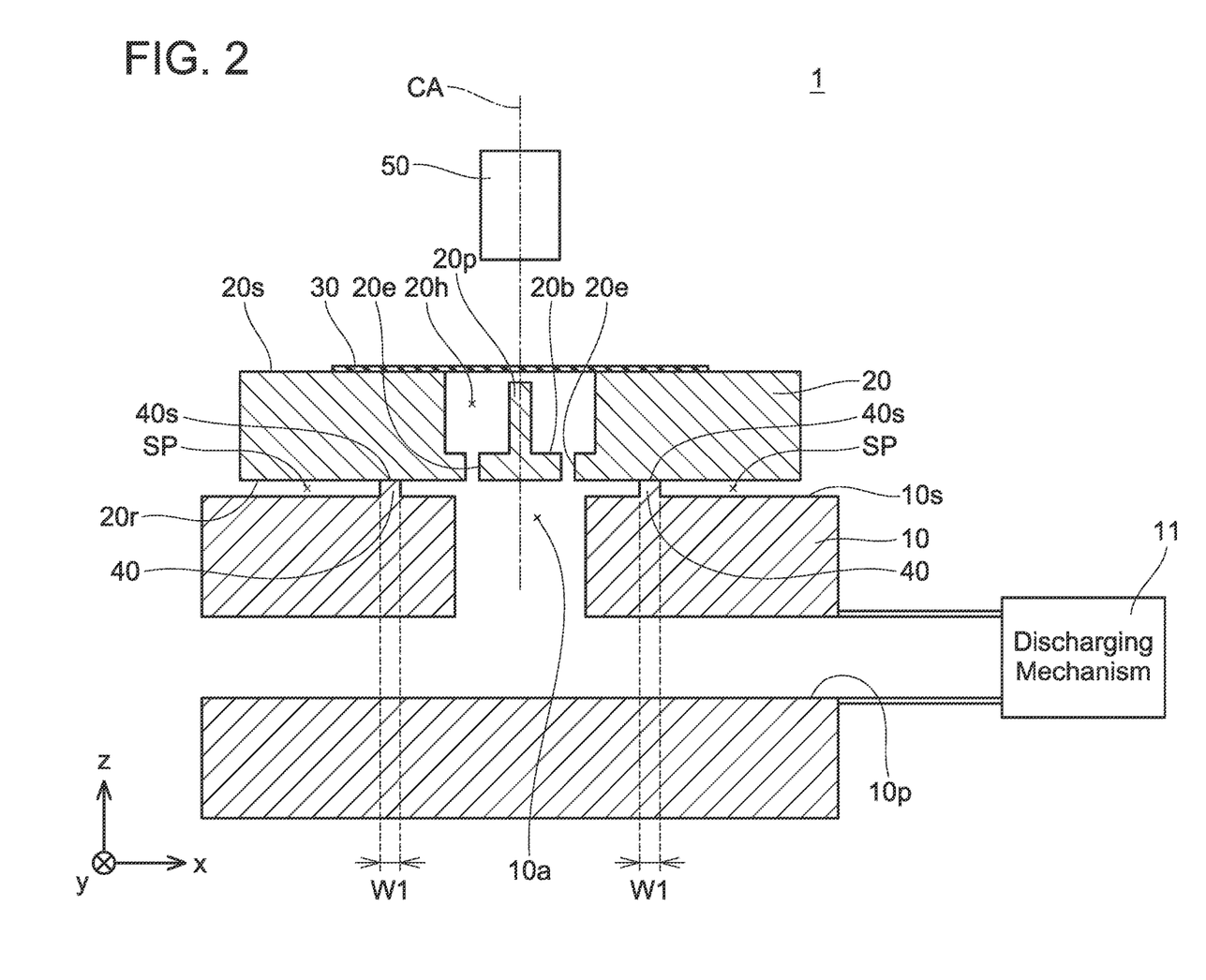
FIG. 2 is a cross-sectional view of the molding device 1 of the first embodiment.

FIGS. 1 and 2 show a molding device 1 of a first embodiment. FIG. 1 is a top view diagram. FIG. 2 is a cross-sectional view along a line II-II in FIG. 1. The molding device 1 includes a plate 10, a gas discharging mechanism 11, a mold 20, a quartz plate 30, a ring 40, and a burner 50. In FIG. 1, the ring 40 is indicated by dotted lines, and depiction of the burner 50 and the gas discharging mechanism 11 is omitted.

The plate 10 is a stainless stage for placing the mold 20. A gas outlet 10a is defined in a surface 10s of the plate 10. The gas outlet 10a is connected to the gas discharging mechanism 11 (such as a vacuum pump) via a gas discharging passage 10p.

The mold 20 is a mold for fabricating a semispherical vibrating element 31 by deforming the quartz plate 30 by melting. Graphite is used as a material of the mold 20. In this embodiment, the mold 20 has a round columnar shape with a center axis CA. The mold 20 includes a lower surface 20r, an upper surface 20s, a hole 20h, a post 20p, and through holes 20e. The lower surface 20r and the upper surface 20s are flat surfaces orthogonal to the center axis CA. The upper surface 20s is parallel to the lower surface 20r. The hole 20h is defined in a part of the upper surface 20s. The hole 20h is a space for melting deformation of the quartz plate 30 to take place. In the present embodiment, the hole 20h has a shape in which a circular column centered on the center axis CA is bored out at its center. In other words, the center axis CA is an axis extending through the center of the hole 20h and orthogonal to the lower surface 20r of the mold 20. The hole 20h includes a bottom surface 20b. The post 20p extending upright from the bottom surface 20b is arranged at the center of the hole 20h. The post 20p has a circular column shape with its center axis on the center axis CA. The bottom surface 20b includes a plurality of through holes 20e penetrating to the lower surface 20r. The through holes 20e are communicated with the gas outlet 10a.

As shown in FIG. 1, the ring 40 has a circular ring shape when seen along a direction orthogonal to the lower surface 20r of the mold 20 (z direction). A radius R1 from the center axis CA to an outer circumference of the ring 40 is smaller than a radius R2 from the center axis CA to an outer circumference of the mold 20. The ring 40 has a constant width W1 in a circumferential direction.

As shown in FIG. 2, the ring 40 is integrated with the plate 10, and protrudes out upward from the surface 10s of the plate 10 (toward +z direction). An upper surface 40s of the ring 40 is in contact with the lower surface 20r of the mold 20. In other words, the ring 40 is arranged between the lower surface 20r of the mold 20 and the surface 10s of the plate 10, and connects the mold 20 and the plate 10. In a region where the ring 40 is not arranged, a space SP is defined between the lower surface 20r of the mold 20 and the surface 10s of the plate 10.

The ring 40 surrounds the through holes 20e exposed on the lower surface 20r and also the gas outlet 10a exposed on the surface 10s. Due to this, the ring 40 functions as a seal that ensures airtightness in connecting passages between the through holes 20e and the gas outlet 10a. The width W1 of the ring 40 may be set to a width capable of maintaining predetermined airtightness.

The quartz plate 30 is placed on an upper surface 20s of the mold 20 so as to cover the hole 20h. The quartz plate 30 is a material to be processed for forming the vibrating element. A thickness of the quartz plate 30 may for example be 100 μm. In the present embodiment, the quartz plate 30 has a square shape, however, it may have a point symmetric polygonal shape such as hexagonal or octagonal shape or a circular shape. The burner 50 is mean for heating the quartz plate 30 by flame. The burner 50 is configured to move in an up-down direction along the center axis CA.

(Manufacturing Steps for Vibrating Element)

Manufacturing steps for the vibrating element will be described with reference to FIGS. 2 and 3. In step S1, the mold 20 is placed on the upper surface 40s of the ring 40. In step S2, the quartz plate 30 is placed on the upper surface 20s. In step S3, vacuuming is performed using the gas outlet 10a at a desired degree of vacuum using the gas discharging mechanism 11. In doing so, the hole 20h is also vacuumed through the through holes 20e. The quartz plate 30 is thereby suctioned onto the upper surface 20s and fixed thereon. Due to this, the state shown in FIG. 2 is realized.

In step S4, heat treatment is performed. Specifically, the burner 50 is ignited and is lowered at a desired speed. Due to this, as shown in FIG. 3, the quartz plate 30 can be melted and deformed into a desired shape. In step S5, the burner 50 is lifted up in response to detection of a process ending point and is extinguished. In step S6, an unprocessed region UR of the quartz plate 30 is removed by a CMP method or the like. Then, electrode films are formed (the detailed explanation is omitted). As a result, the vibrating element 31 shown in FIGS. 4A and 4B is completed.

In step S7, a Bird-bath Resonator Gyroscope (BRG) is assembled. FIG. 4A shows a top view of the BRG 60 after it has been assembled. Further, FIG. 4B shows a cross-sectional view along a line B-B in FIG. 4A. The BRG 60 includes the vibrating element 31, a glass substrate 61, and silicon electrodes 62. The vibrating element 31 includes an anchor 31a and a rim 31r. The anchor 31a is fixed to a fixing part 61f of the glass substrate 61. The silicon electrodes 62 are arranged to surround a circumference of the rim 31r.

(Effects)

The problem that is solved by the art disclosed herein will be described. In order to improve sensitivity of the BRG 60 (that is, to oscillate significantly by excitation with a low driving voltage and obtain a large change in capacitance as its output), an inclination angle θ (see FIG. 4B) of the rim 31r of the vibrating element 31 needs to be closer to 90°. By arranging the rim 31r and side surfaces of the silicon electrodes 62 parallel with reduced distance, the change in static capacitance caused by the rotation angle is amplified. Here, a case of fabricating the vibrating element 31 using a plate 1010 shown in FIG. 5 will be described as a first comparative example. The plate 1010 in the first comparative example does not have the ring 40. As such, an entirety of the lower surface 20r of the mold 20 is in contact with a surface 1010s of the plate 1010. Bold arrows indicate thermal conduction, and a greater number of the arrows and a larger area of each arrow indicate that the thermal conduction is greater. In the mold 20 of the first comparative example, due to the entirety of the lower surface 20r serving as a thermal conduction passage to the plate 1010, a width HW1 of the thermal conduction passage is significantly wide. As such, as shown by the bold arrows, majority of heat in the quartz plate 30 is dissipated to the plate 1010 through the mold 20. As a result of this, the quartz plate 30 comes to have a temperature gradient in which a temperature decreases radially outward toward the outer circumference of the hole 20h, by which a non-deformed region NR (region that is not heated to a softening temperature of quartz or higher and thus the quartz plate 30 does not deform) is generated. When this occurs, the inclination angle θ becomes smaller than 90°.

Figure 3:
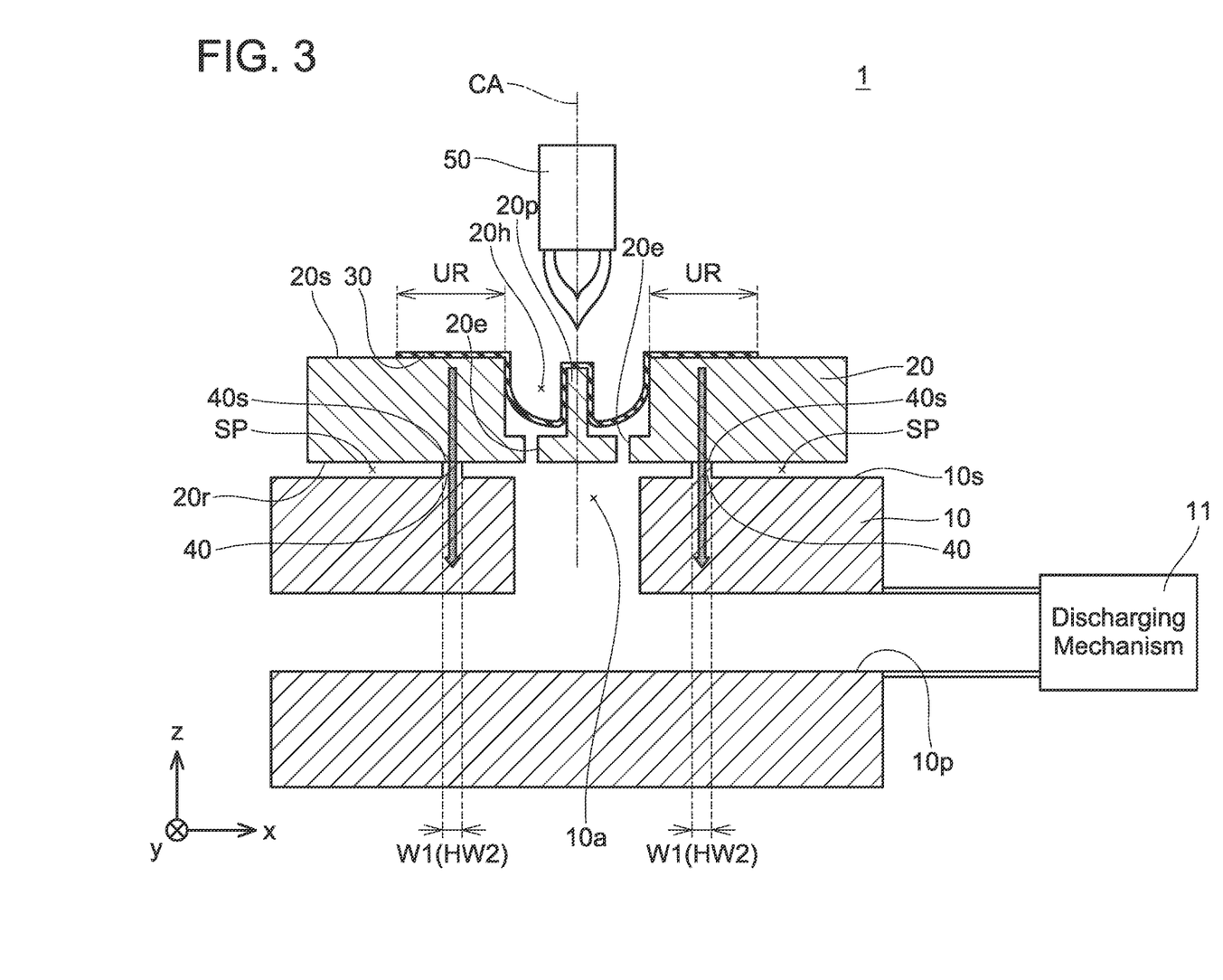
FIG. 3 is a cross-sectional view after melting deformation takes place.
Figure 4A:
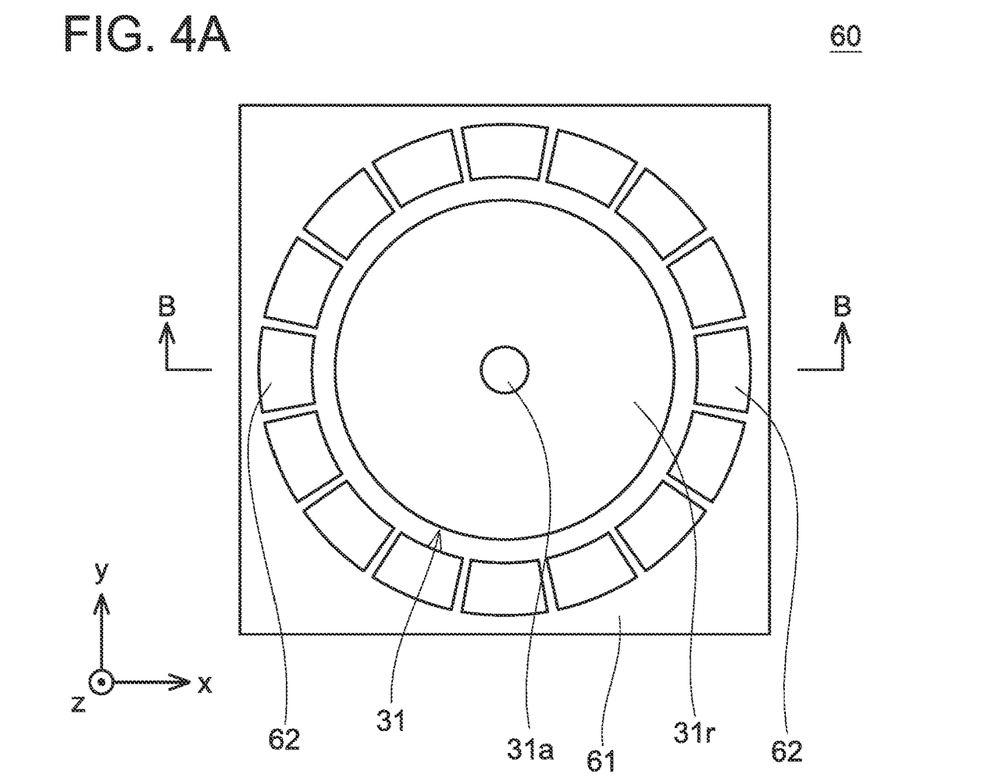
FIGS. 4A and 4B are a top view and a cross-sectional view of a BRG 60.
Figure 4B:
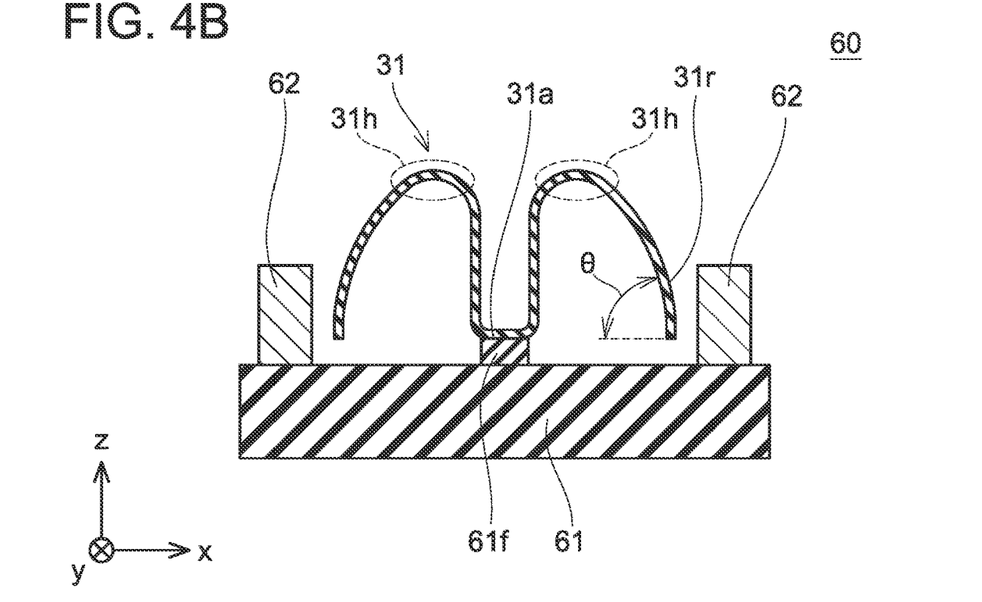
Figure 5:
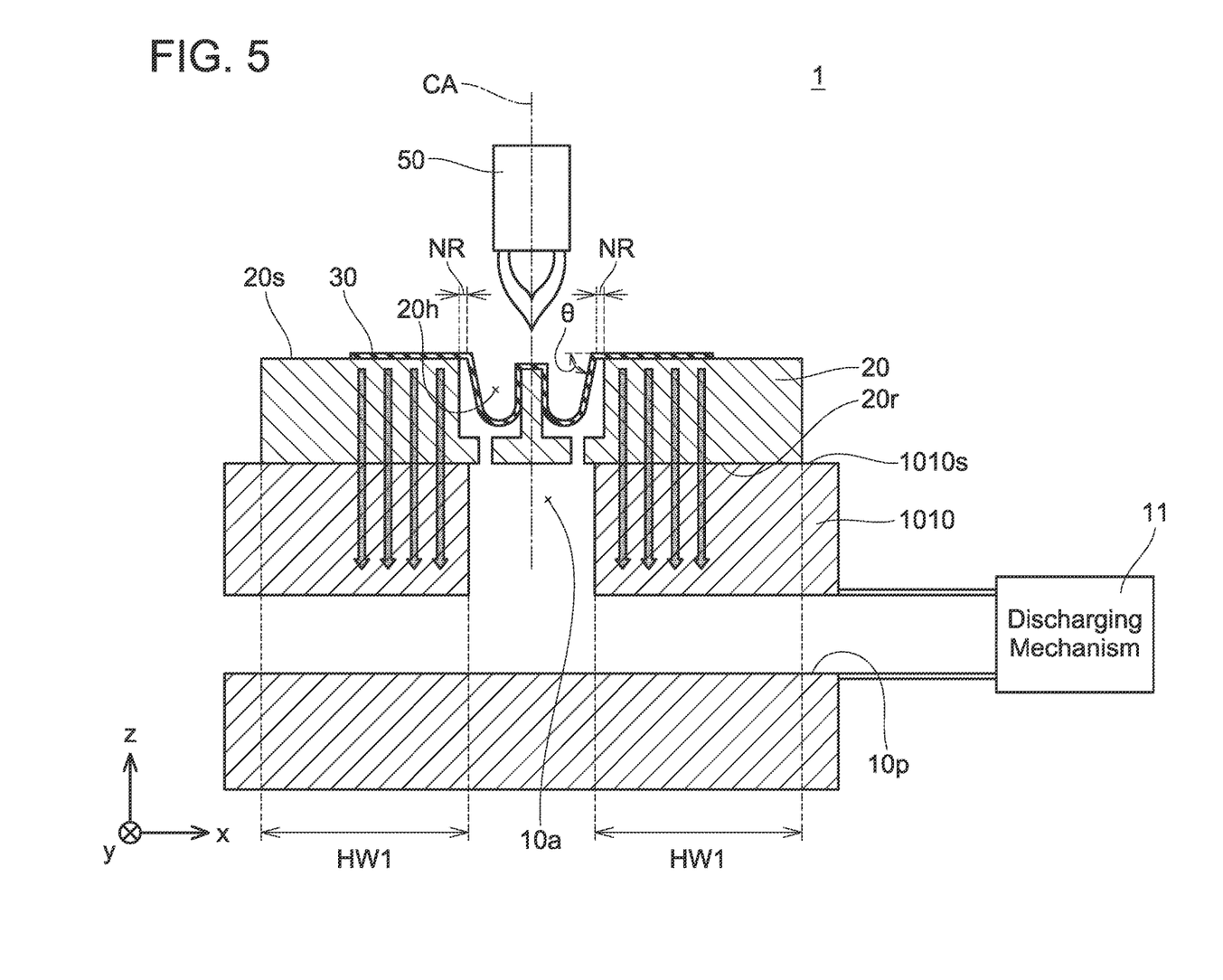
FIG. 5 is a cross-sectional view of a case in which a vibrating element 31 is fabricated using a plate 1010 of a first comparative example.

As a contrast to the above, a case of fabricating the vibrating element 31 using the mold 20 of the present embodiment as shown in FIG. 3 will be described. The mold 20 of the present embodiment has the space SP defined between the lower surface 20r of the mold 20 and the surface 10s of the plate 10 by the presence of the ring 40. Thermal conductivity of the air in the space SP is extremely low as compared to thermal conductivity of the graphite of the mold 20. As such, the ring 40 can be configured as the sole thermal conduction passage to the plate 10. As a result of this, a width HW2 of the thermal conduction passage of the present embodiment (FIG. 3) can be made significantly narrower than the width HW1 of the thermal conduction passage of the first comparative example (FIG. 5). As shown by an arrow in FIG. 3, thermal conduction from the mold 20 to the plate 10 can be reduced significantly. That is, by storing the heat in the mold 20, a temperature distribution in the mold 20 can be uniformized. Due to this, the temperature gradient that occurs in the quartz plate 30 can be suppressed, as a result of which generation of the non-deformed region NR can be suppressed. Thus, the inclination angle θ can be set closer to 90°.

Further, in the mold 20 of the present embodiment, the post 20p can be suppressed from being locally heated. As such, a significant local deformation in vicinity of the post 20p can be suppressed from occurring. Thus, it becomes possible to increase a thickness of a top part 31h of the vibrating element 31 (FIG. 4B) and/or configure a position of the top part 31h to be located closer to an outer circumference of the vibrating element 31. Further, since the heat can be stored in the mold 20, an inclination of temperature rise in the quartz plate 30 can be made larger. This enables to shorten processing time. Further, as the processing time is shortened, gas consumption can be reduced, and the number of repeated use of the mold 20 can be increased.

Figure 6:
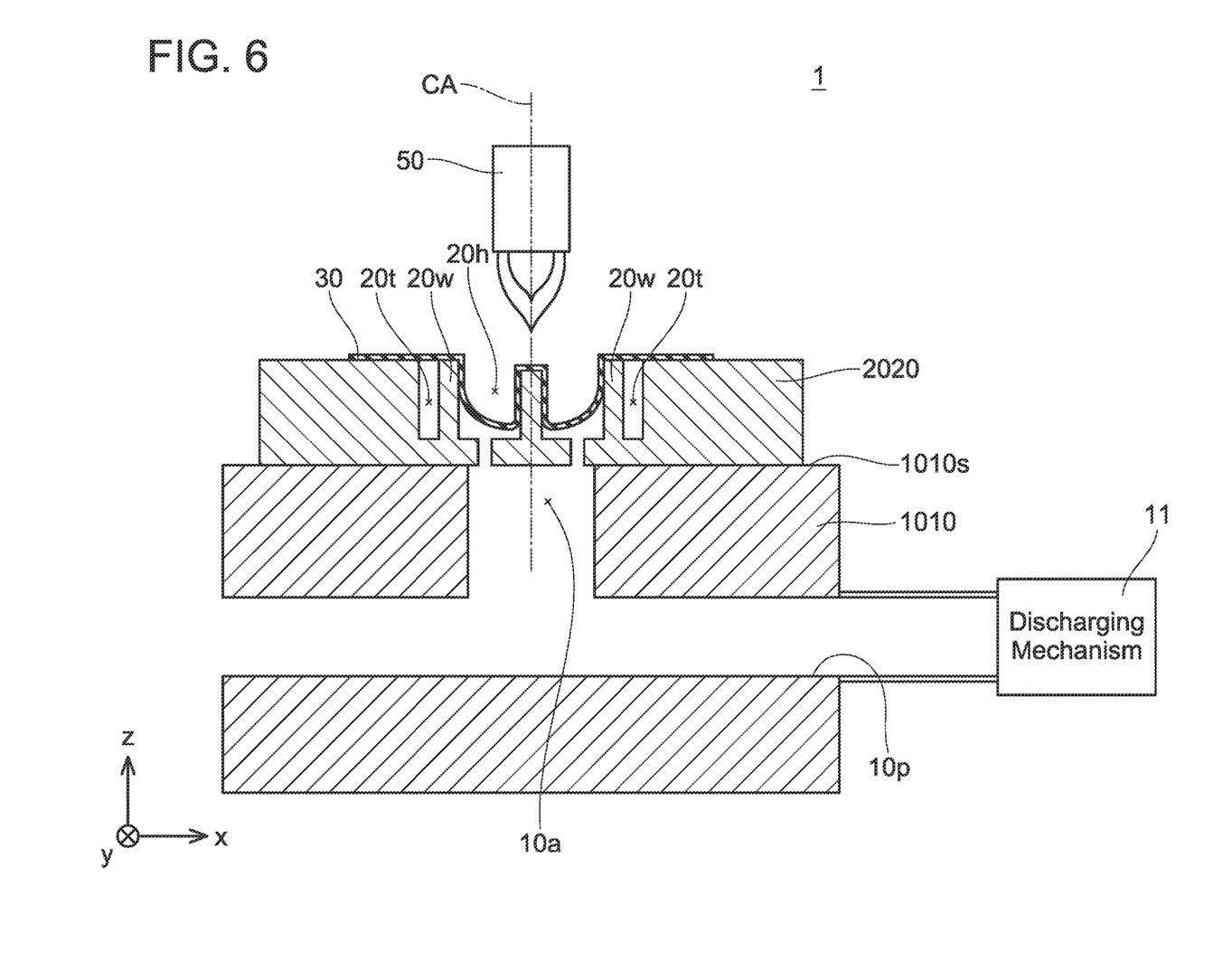
FIG. 6 is a cross-sectional view of a case in which a vibrating element 31 is fabricated using a plate 2020 of a second comparative example.

A case of fabricating the vibrating element 31 using a mold 2020 shown in FIG. 6 will be described as a second comparative example. The mold 2020 in the second comparative example has an outer circumferential groove 20t defined to surround the outer circumference of the hole 20h. Further, the mold 2020 is placed on the plate 1010 that does not have a ring. Due to thermal insulation realized by the outer circumferential groove 20t, the heat from the quartz plate 30 can be suppressed from being transmitted toward an outer circumference of the mold 2020. As a result, the temperature gradient that occurs in the quartz plate 30 can be suppressed. However, in the second comparative example, high processing precision is required for the outer circumferential groove 20t. For example, if a positional displacement of the outer circumferential groove 20t with respect to the hole 20h occurs or a circumferential width of the outer circumferential groove 20t becomes uneven, heat dissipation becomes ununiform (asymmetric), and symmetry of a shape of the vibrating element 31 is thereby degraded. Further, by having the outer circumferential groove 20t, strength of the mold 2020 is decreased. Further, since a thin portion such as an inner wall 20w that is to be heated by flame would be present, degradation of the mold caused by flame processing (such as graphite burnout) progresses. To the contrary, by the ring 40 which the plate 10 comprises, the mold 20 of the present embodiment can suppress the temperature gradient that occurs in the quartz plate 30. As such, processing for the outer circumferential groove 20t is not needed for the mold 20. The deterioration in the symmetry of the vibrating element 31, the decrease in the strength of the mold 20, and the progression of the degradation of the mold 20 can be suppressed from occurring.

The mold 20 of the present embodiment sets a radius R1 from the center axis CA to the outer circumference of the ring 40 to be smaller than a radius R2 from the center axis CA to the outer circumference of the mold 20 (FIG. 1). Due to this, under a condition of setting a constant width W1 of the ring 40 in a circumferential direction, an area of the upper surface 40s can be made smaller as compared to a case of forming a ring with the radius R2. Thus, the thermal conduction from the mold 20 to the plate 10 can further be reduced.

Second Embodiment

Figure 7:
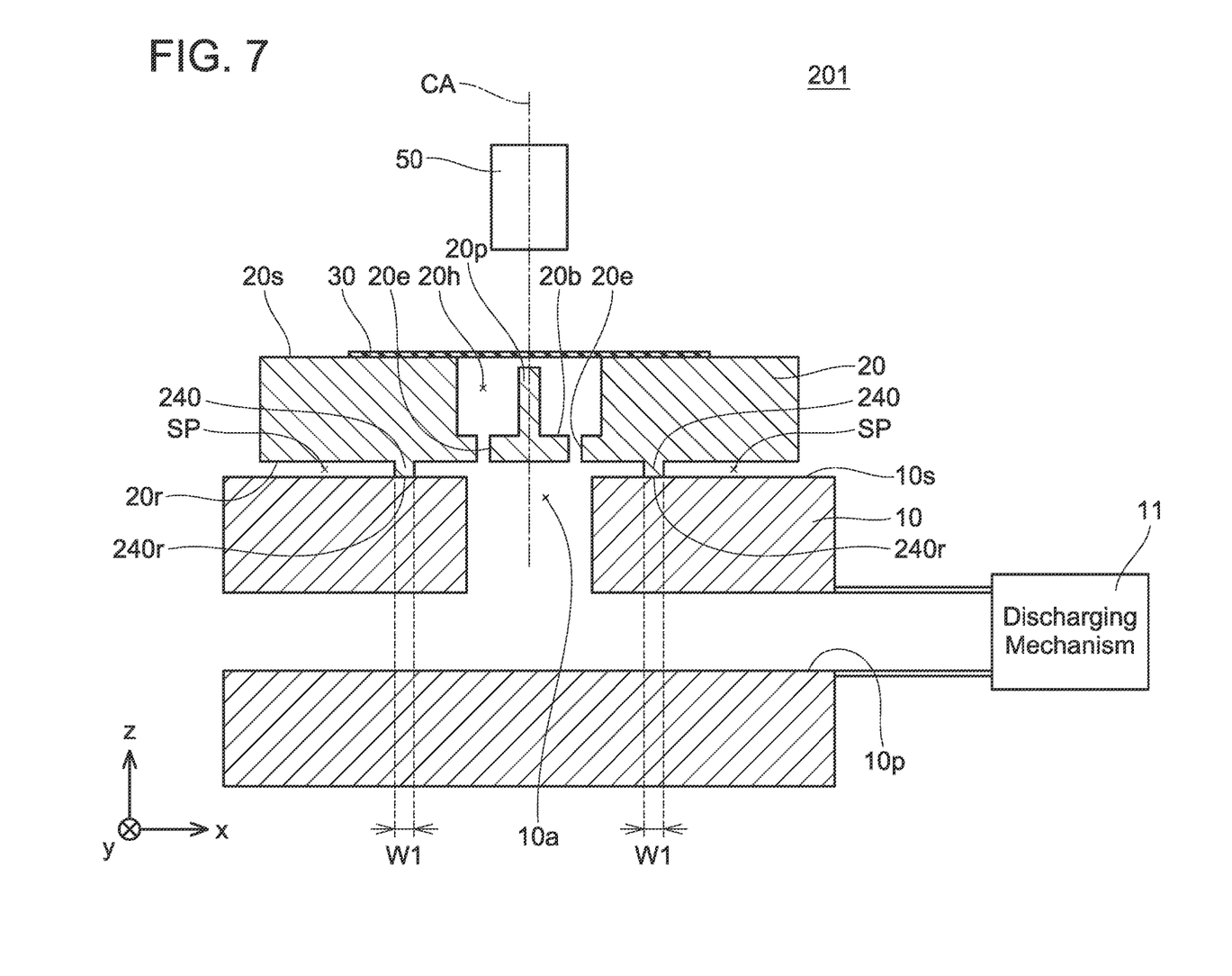
FIG. 7 is a cross-sectional view of a molding device 201 of a second embodiment.

FIG. 7 shows a cross-sectional view of a molding device 201 of a second embodiment. The second embodiment differs from the first embodiment in having a ring 240. Portions that are same as those of the molding device 1 of the first embodiment are given the same reference signs, and the descriptions thereof will be omitted.

The ring 240 is configured integrally with the mold 20, and protrudes out downward from the lower surface 20r of the mold 20 (toward −z direction). A lower surface 240r of the ring 240 is in contact with the surface 10s of the plate 10. With the second embodiment as well, a space SP can be defined between the lower surface 20r of the mold 20 and the surface 10s of the plate 10. As such, the same effect as that of the molding device 1 of the first embodiment can be achieved.

Third Embodiment

Figure 8:
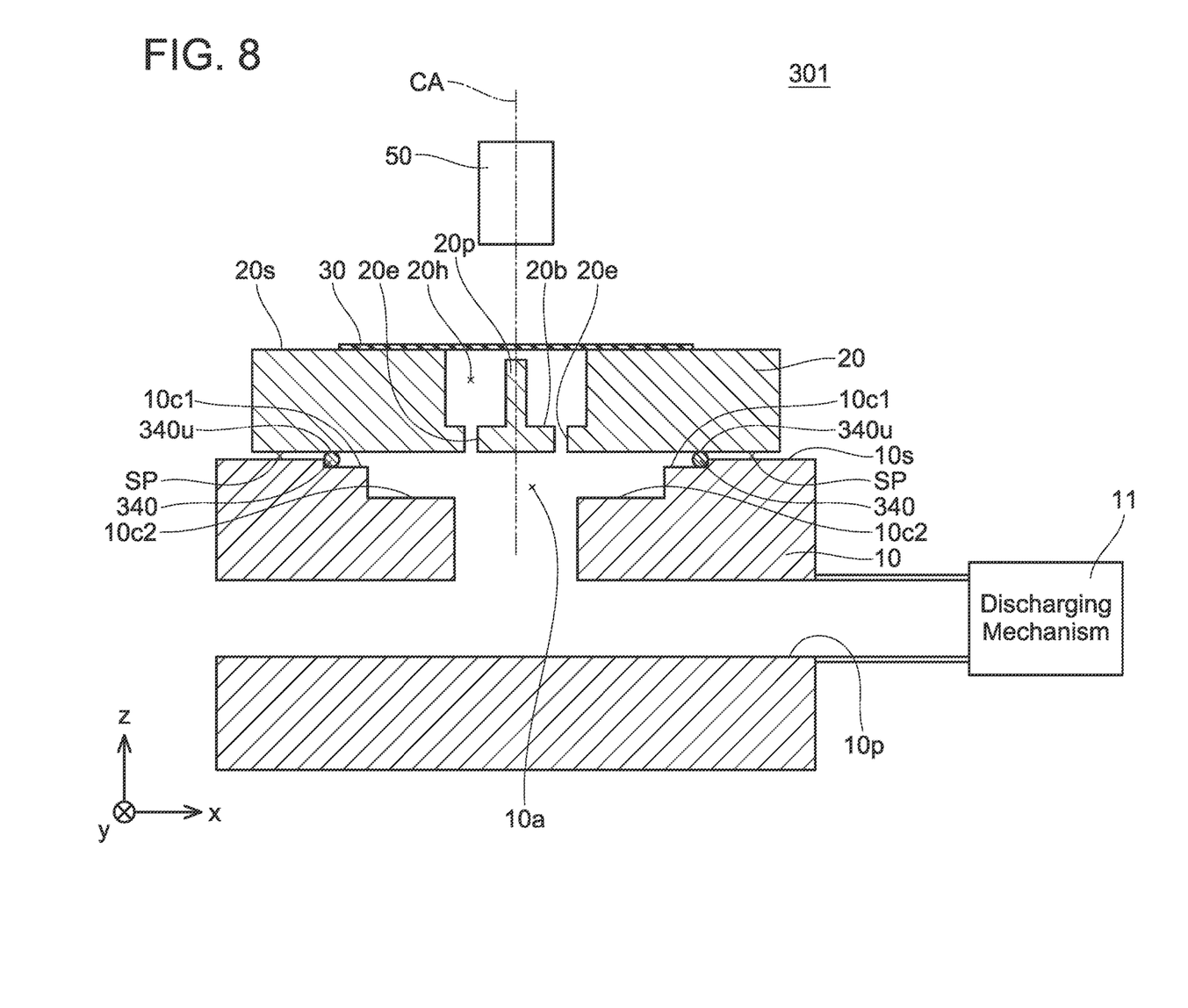
FIG. 8 is a cross-sectional view of a molding device 301 of a third embodiment.

FIG. 8 shows a cross-sectional view of a molding device 301 of a third embodiment. The third embodiment differs from the first embodiment in having a ring 340. Portions that are same as those of the molding device 1 of the first embodiment are given the same reference signs, and the descriptions thereof will be omitted.

The ring 340 is configured as a separate member from the plate 10 and the mold 20. The surface 10s of the plate 10 includes a first recess 10c1 corresponding to a shape of the ring 340. The ring 340 is arranged inside the first recess 10c1. Positioning of the ring 340 can automatically be performed by the first recess 10c1. In a state where the ring 340 is arranged inside the first recess 10c1, an upper end 340u of the ring 340 protrudes out beyond the surface 10s of the plate 10. Due to this, a space SP can thereby be defined.

Further, a second recess 10c2 having a greater depth than the first recess 10c1 is defined on an inner circumferential side of the first recess 10c1. Due to this, a volume of the gas outlet 10a can be increased. A pressure fluctuation that occurs when a leak occurs while vacuuming the gas outlet 10a can be suppressed.

The ring 340 is constituted of a material having a melting point of 800° C. or higher. Specific examples of the material of the ring 340 include high-melting point metal (such as gold, platinum, and zirconia), and various alloys and oxides. Some of materials that can be used for the ring 340 will be listed below. These materials may be used solely or in combinations in the form of mixtures or compounds.

Examples of the material of the ring 340: gold, platinum, zirconia, silver, aluminum nitride, silicon nitride, boron nitride, silicon carbide, alumina, germanium, cobalt, samarium, silicon, scandium, stainless (steel), fused silica, tungsten, tantalum, titanium, iron, copper, niobium, nickel, neodymium, manganese, molybdenum.

Fourth Embodiment

Figure 9:
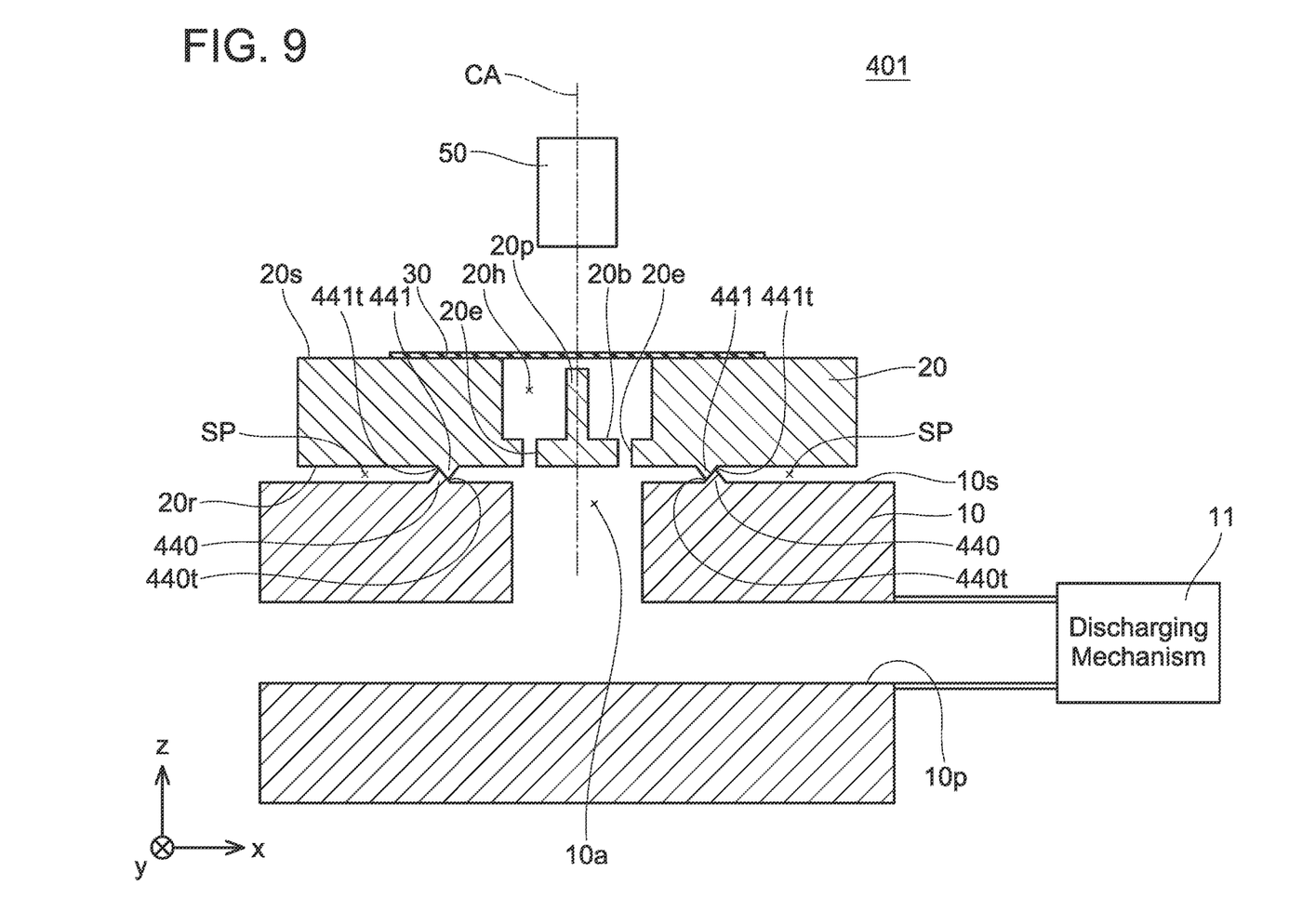
FIG. 9 is a cross-sectional view of a molding device 401 of a fourth embodiment.

FIG. 9 shows a cross-sectional view of a molding device 401 of a fourth embodiment. The fourth embodiment differs from the first embodiment in having tapered rings 440 and 441. Portions that are same as those of the molding device 1 of the first embodiment are given the same reference signs, and the descriptions thereof will be omitted.

The ring 440 is configured integrally with the plate 10, and protrudes out upward from the surface 10s (toward +z direction). The ring 441 is configured integrally with the mold 20, and protrudes out downward from the lower surface 20r (toward -z direction). The rings 440 and 441 have triangular cross sections along a plane extending through the center axis CA. Due to this, a tapered surface 440t is defined on a radially inner side of the ring 440. Further, a tapered surface 441t is defined on a radially outer side of the ring 441. These tapered surfaces 440t and 441t contact each other.

When the mold 20 is placed on the plate 10, the tapered surface 441t slides on the tapered surface 440t by the weight of the mold 20. Due to this, positioning of the mold 20 can automatically be performed. Further, since the tapered surfaces 440t and 441t fit each other without any gap in between them, airtightness can be improved.

While specific examples of the present disclosure have been described above in detail, these examples are merely illustrative and place no limitation on the scope of the patent claims. The technology described in the patent claims also encompasses various changes and modifications to the specific examples described above.

(Variant)

Figure 10:
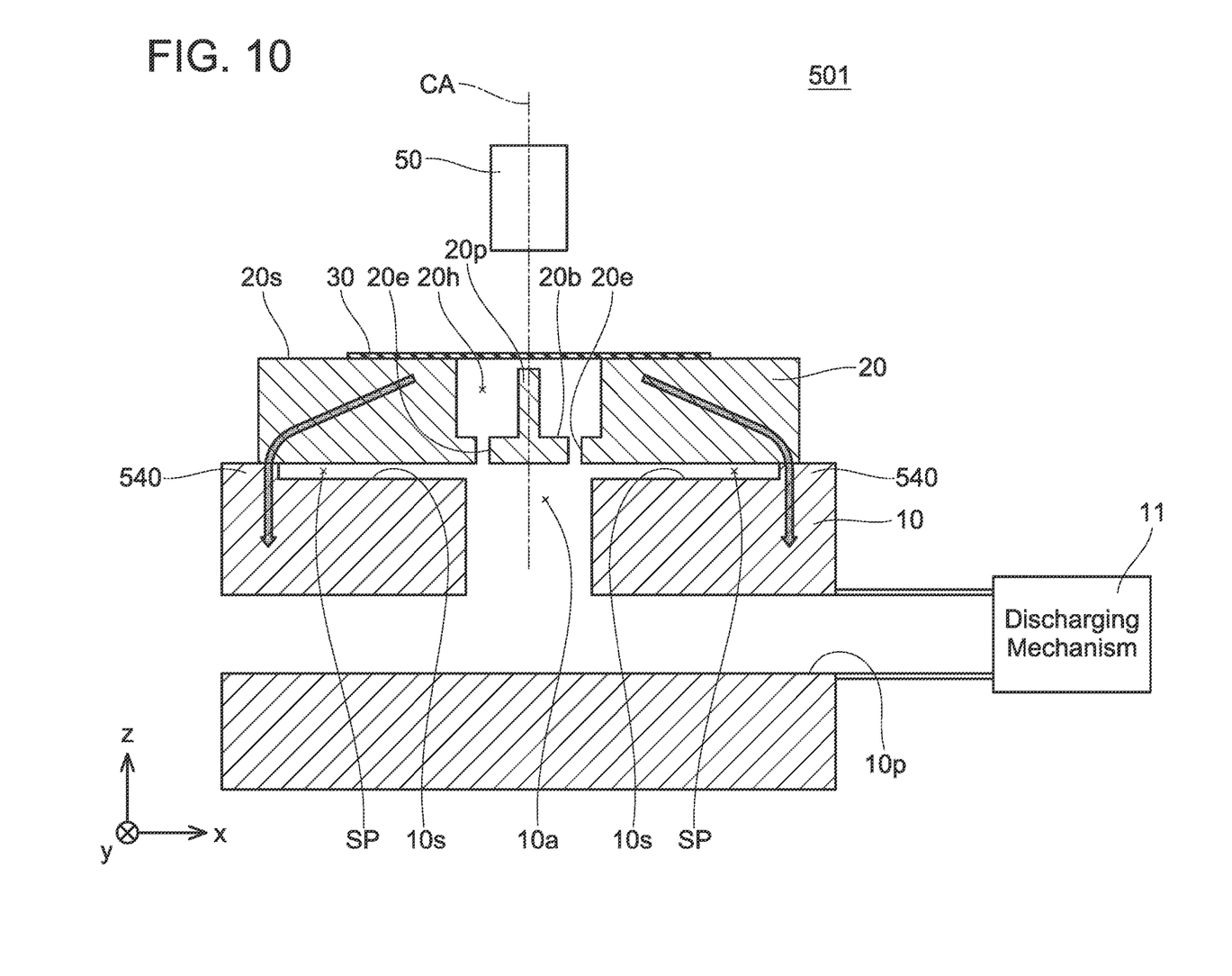
FIG. 10 is a cross-sectional view of a molding device 501 of a variant.

In the first embodiment, the shape of the ring 40 integrally configured with the plate 10 is not limited to the shape shown in FIG. 2, but may have other variations. For example, as shown in a molding device 501 of a variant in FIG. 10, a ring 540 may be arranged at an outermost circumference of the plate 10. By configuring as such, a heat transfer route from the quartz plate 30 to the plate 10 through an outermost circumference of the mold 20 as indicated by bold arrows can be realized, thus a distance of the heat transfer route can be set long. Thus, the temperature gradient is suppressed from being generated in the quartz plate 30. In the second embodiment, the shape of the ring 240 integrally configured with the mold 20 is similarly not limited to the shape shown in FIG. 7. For example, a ring may be arranged at the outermost circumference of the mold 20.

In the third embodiment (FIG. 8), the ring 340 formed as a separate member may be arranged in various different ways. For example, the ring 340 may be arranged on the flat surface 10s in which the first recess 10c1 is not defined.

In the fourth embodiment (FIG. 9), the shape and the contacting configuration of the tapered surface may be configured in various ways. For example, the tapered surface on the radially outer side of the ring 440 and the tapered surface on the radially inner side of the ring 441 may contact each other. Further, for example, the ring 440 may have a groove with a V cross-sectional shape and the ring 441 may include a projection with a triangular cross-sectional shape, and these may mesh with each other.

The material of the mold 20 is not limited to graphite. Various materials may be used so long as the material has predetermined thermal shock resistance and thermal conductivity, and boron nitride may for example be used.

The material of the vibrating element is not limited to the quartz plate 30. Any material may be used so long as the material is a dielectric that deforms by melting.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A molding device comprising a mold, a plate, and a ring, wherein
   the mold comprises:
      a lower surface,
      an upper surface parallel to the lower surface,
      a hole in a part of the upper surface, and
      a through hole extending from a bottom surface of the hole to the lower surface of the mold;
   the plate comprises a surface with a gas outlet;
   the ring is a separate member from the plate and the mold;
   the surface of the plate includes a first recess corresponding to a shape of the ring;
   the ring is in the first recess and an upper end of the ring protrudes out from the surface of the plate;
   the ring and the first recess have a circular ring shape centered on a center axis which extends through a center of the hole and is orthogonal to the lower surface of the mold;
   a radius from the center axis to an outer circumference of the ring is equal to a radius from the center axis to an inner circumference of the first recess;
   the ring is between the lower surface of the mold and the surface of the plate and connects the mold and the plate;
   the ring surrounds the through hole on the lower surface of the mold and the gas outlet on the surface of the plate; and
   in a region where the ring is not, a space is between the lower surface of the mold and the surface of the plate.

2. The molding device according to claim 1, wherein a melting point of the ring is equal to or higher than 800° C.

3. The molding device according to claim 1, wherein a distance from the center axis to the outer circumference of the ring is smaller than a distance from the center axis to an outer circumference of the mold.

4. The molding device according to claim 1, wherein the ring has the circular ring shape when seen along a direction orthogonal to the lower surface of the mold.

5. The molding device according to claim 1, wherein the surface of the plate further includes a second recess that is on an inner circumferential side of the first recess, and
   the second recess has a greater depth than the first recess.

6. The molding device according to claim 1, wherein the ring has a circular cross-section.

7. A molding device comprising a mold, a plate, a first ring and a second ring, wherein
   the mold comprises:
      a lower surface,
      an upper surface parallel to the lower surface,
      a hole in a part of the upper surface, and
      a through hole extending from a bottom surface of the hole to the lower surface of the mold;
   the plate comprises a surface with a gas outlet;

the first ring is integrated with the plate and protrudes out from the surface of the plate;

the second ring is integrated with the mold and protrudes out from the lower surface of the mold;

the first ring includes a first tapered surface on a radially inner side of the first ring;

the second ring includes a second tapered surface on a radially outer side of the second ring;

the first tapered surface and the second tapered surface are in contact with each other and connect the mold and the plate;

the first ring surrounds the through hole on the lower surface of the mold and the gas outlet on the surface of the plate; and in a region where the ring is not, a space is between the lower surface of the mold and the surface of the plate.

\* \* \* \* \*